Patented Nov. 9, 1937

2,098,599

UNITED STATES PATENT OFFICE 2,098,599

YELLOW SUBSTANTIVE DYESTUFF FOR COTTON

Max Schubert, Frankfort-on-the-Main-Fechenheim, Germany, assignor to General Aniline Works, Inc., New York, N. Y., a corporation of Delaware No Drawing. Application October 23, 1935, Serial No. 46,335. In Germany November 7, 1934

1 Claim. (Cl. 260—44)

My present invention relates to a yellow substantive dyestuff for cotton.

According to British specification No. 19,061/91 by acting with alkaline oxidizing agents on dehydrothiotoluidine sulfonic acid and its homologues yellow substantive dyestuffs for cotton of the azodyestuff type are obtained.

In accordance with my present invention a greenish yellow dyestuff of an essentially increased fastness to light is obtained by subjection to the above oxidizing process the 1-p-aminophenyl-5-carboxy-benzothiazole-sulfonic acid of the formula:

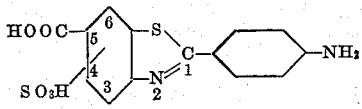

In order to further illustrate my invention the following example is given, the parts being by weight and all temperatures in centigrade degrees, but it is, however, to be understood, that my invention is not limited to the particular products nor reacting conditions mentioned therein.

Example

To a solution of 35 parts of the 1-p-aminophenyl-5-carboxy-benzothiazole sulfonic acid (cf. German Patent No. 277,395) in 800 to 1000 parts of water and 8 to 9 parts of caustic soda while stirring 180 to 220 parts of a sodium hypochlorite solution are added containing 100 to 120 parts of active chlorine per liter. The mixture is kept for some hours at room temperature and finally heated at 70 to 80° C. The dyestuff thus formed is isolated by adding sodium chloride. It forms when dry an orange powder easily soluble in water and dyes vegetable fibers greenish yellow shades of excellent fastness to light. It dissolves in concentrated sulfuric acid to a reddish brown solution.

I claim:

A yellow substantive dyestuff for cotton, which dyestuff forms when dry an orange powder easily soluble in water and dyes vegetable fibers greenish yellow shades of excellent fastness to light, which dyestuff dissolves in concentrated sulfuric acid to a reddish brown solution, which dyestuff is obtained by acting with alkaline oxidizing agents containing reactive chlorine on 1-p-aminophenyl-5-carboxybenzothiazole-sulfonic acid of the formula:

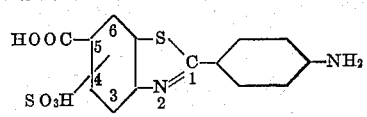

MAX SCHUBERT.